Jan. 8, 1957   H. G. SHAKESPEARE ET AL   2,776,803
SPINNING TYPE FISHING REEL
Filed Dec. 28, 1953   4 Sheets-Sheet 2

INVENTORS
Henry G. Shakespeare
Gerald D. Harrington
BY Oscar A. Earl
Attorney

Jan. 8, 1957 H. G. SHAKESPEARE ET AL 2,776,803
SPINNING TYPE FISHING REEL
Filed Dec. 28, 1953 4 Sheets-Sheet 3

INVENTORS
Henry G. Shakespeare
Gerald D. Harrington
By Otto A. Earl
Attorney.

Jan. 8, 1957 H. G. SHAKESPEARE ET AL 2,776,803
SPINNING TYPE FISHING REEL
Filed Dec. 28, 1953 4 Sheets-Sheet 4
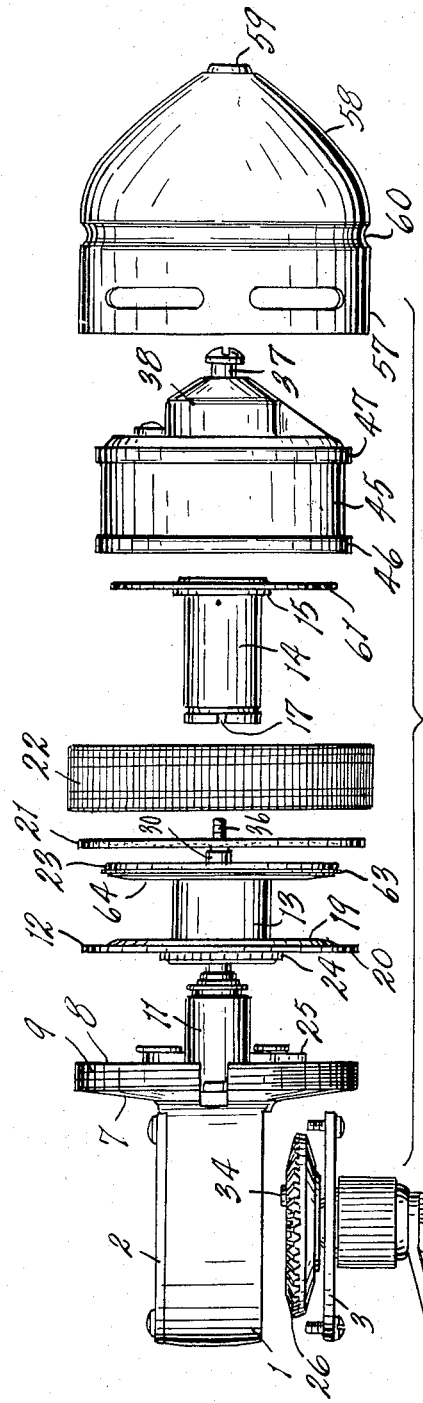
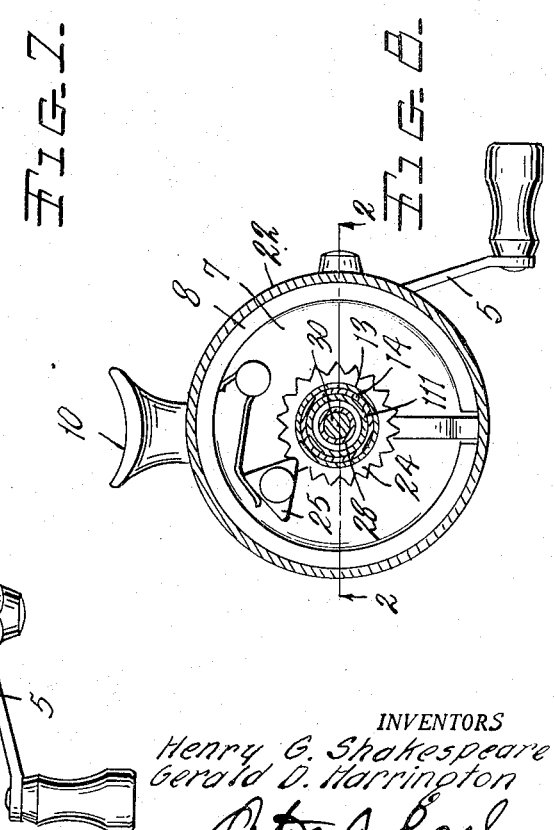
INVENTORS
Henry G. Shakespeare
Gerald D. Harrington
By Otis A. Earl
Attorney.

United States Patent Office 2,776,803
Patented Jan. 8, 1957

2,776,803

SPINNING TYPE FISHING REEL

Henry G. Shakespeare and Gerald D. Harrington, Kalamazoo, Mich., assignors to Shakespeare Company, Kalamazoo, Mich.

Application December 28, 1953, Serial No. 400,483

19 Claims. (Cl. 242—84.4)

This invention relates to improvements in spinning type fishing reels.

The main objects of this invention are:

First, to provide a spinning type fishing reel having a rotatable level wind member with a line pickup finger pivotally mounted thereon in such a manner that the level wind member can be easily engaged with and disengaged from a driving spindle in proper relationship with respect to a finger actuating pin on the spindle.

Second, to provide a spinning type fishing reel with a line winding member having hardened line supporting rings rotatably mounted thereon to guide the fish line over the line winding member without causing wear in the line winding member.

Third, to provide a spinning type fishing reel with a line winding member that is axially reciprocable over a line spool to wind the line in a level manner on the spool, the spool being provided with a flexible guard disc to prevent the line from becoming entangled between the spool and the line winding member.

Fourth, to provide a spinning type fishing reel with a rotatable line winding member and a coacting housing and line guide that guides the fish line in proper relationship to the line winding member.

Fifth, to provide a spinning type fishing reel which is easy to operate and disassemble for cleaning and oiling and in which the fish line is at all times positively controlled to prevent tangling of the line.

Sixth, to provide a spinning type fishing reel, the parts of which are easy to manufacture and assemble in the proper relationship.

Other objects and advantages of the invention will be apparent from a consideration of the following description and claims:

The drawings, of which there are 4 sheets, illustrate a preferred embodiment of the reel.

Fig. 7 is an exploded elevational view of the major elements of the reel.

Fig. 8 is a transverse cross-sectional view taken along the plane of the line 8—8 in Fig. 1.

Fig. 9 is a fragmentary enlarged cross-sectional view through the front rim of the line winding member.

Fig. 10 is a fragmentary cross-sectional view taken along the plane of the line 10—10 in Fig. 1.

Figure 1:
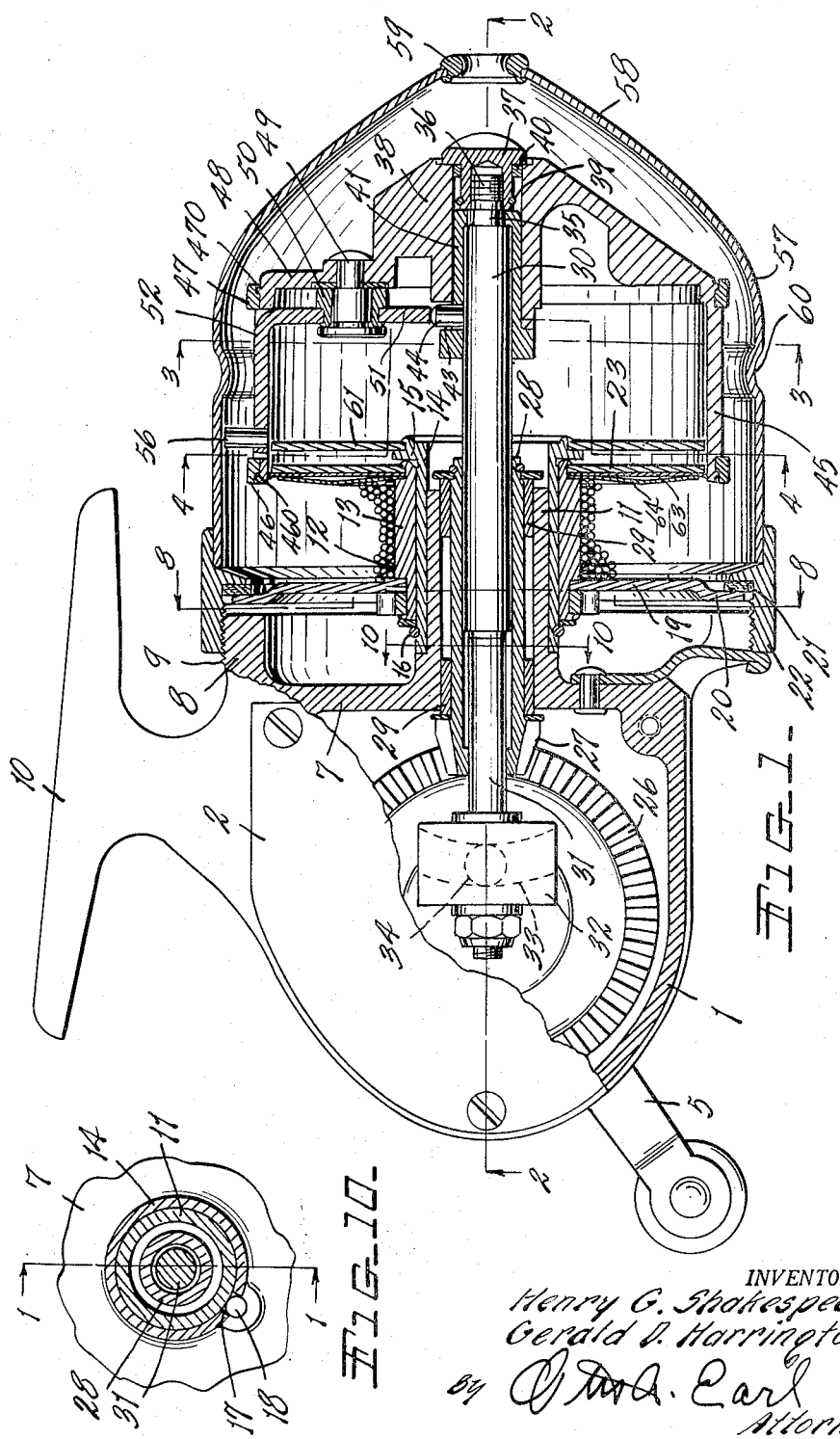
Fig. 1 is a side elevational view, partially broken away in vertical longitudinal cross-section of the reel in line winding or retrieving position.

The present invention relates to improvements in the spinning type fishing reel disclosed and claimed more particularly in our co-pending application of the same name, Serial Number 271,324, filed February 13, 1952, now Patent No. 2,724,563, issued November 22, 1955. The theory of the operation of the present fishing reel is generally the same as the theory of operation of the prior disclosed reel.

The reel comprises a gear box or casing 1 having removable side plates 2 and 3. The shaft 4 of the crank 5 is mounted in a bearing 6 secured to the side plate 3. The front wall 7 of the gear box has a forwardly projecting annular flange 8 thereon which is exteriorly threaded as at 9 and the top of the gear box is provided with an integral reel seat base member 10.

The forward wall 7 of the gear box is provided with a forwardly projecting tubular bearing support on which the reel spool designated generally at 12 is rotatably mounted. The hub 13 of the spool is rotatable on a tubular bushing 14 sleeved over the bearing support 11 and is retained axially thereon between an outer end flange 15 on the bushing and a snap ring 16 on the inner end of the bushing. The bushing 14 is longitudinally slotted at its inner end as at 17 (see Fig. 10) to receive the pin 18 which projects from the end wall of the gear box to prevent rotation of the bushing 14.

The inner flange 19 of the line spool is offset rearwardly at its periphery as at 20 to provide a forwardly facing friction surface coacting with the friction ring 21. The ring 21 is carried by a radially inwardly projecting flange on the tubular drag member 22. The drag member is adjustably threaded on the threads 9 on the flange of the gear casing. The forward flange 23 of the line spool is of shorter diameter than the rear flange 19. A star click wheel 24 is mounted on the hub of the line spool rearwardly of the rear flange 19 to coact with a spring pressed click detent 25 mounted on the front wall 7 of the gear casing.

Rotatably driven by the crank shaft 4 within the gear housing 1 is a bevel gear 26, the teeth of which are constantly in driving engagement with the teeth of a pinion 27. The pinion 27 has a tubular hub 28 rotatably supported within the tubular bearing support 11 by bushings 29. Axially slidably mounted within the hub 28 and pinion 27 is a spindle 30 having a reduced portion 31 at its rear end of noncircular outline drivingly engaged with the pinion 27. The rear end of the spindle 30 extends through and carries the block 32 of a Scotch yoke, the block being slotted or grooved along an arc as at 33 to receive the pin 34 projecting from the side of the gear 26. Rotation of the crank 5 and shaft 4 thus rotates the pinion 27 and spindle 30 and simultaneously reciprocates the spindle 30 along its axis of rotation.

The front end of the spindle 30 is reduced as at 35 and threaded as at 36 to engage the screw headed retaining nut 37. The nut 37 is loosely but permanently retained in the apex of the conical outer end of a line winding member 38 by means of a snap ring 39 engaged with the inner end of the nut and a retaining ring 40 pressed into the outer end of the line winding member. The head of the nut 37 overlies the end of the line winding member to clamp the line winding member axially to the spindle 30.

The spindle 30 is rotatably received in a bushing 41 pressed into the inner side of the line winding member 38.

The bushing 41 and the supporting hub of the line winding member are axially slotted as at 42 and peripherally slotted as at 43 to form a bayonette slot connection between the bushing and a pin 44 projecting radially from the spindle 30. In the assembled position of the spindle and line winding member as shown in Fig. 1 the pin 44 is held in axially registering relationship with the slot 43 by the nut 37 and limited rotation between the spindle and the line winding member is permitted as determined by the pin 44.

The periphery of the conical line winding member 38 is provided with a rearwardly projecting cylindrical flange 45 that is adapted to slide rearwardly over the front flange 23 of the line spool as the spindle 30 and line winding member are reciprocated by the Scotch yoke 32. At its rear edge the cylindrical flange 45 is provided with an annular bead and groove 460 over which is snapped a hardened and polished wear ring 46 that is relatively rotatably mounted on the flange as is most clearly illustrated in Fig. 6. The forward edge of the cylindrical flange of the line winding member is provided with a similar annular bead and groove 470 over which is snapped a hardened and polished wear ring 47 as is most clearly illustrated in Fig. 9. The ring 47 rotates in the groove 470 in the same manner as the ring 46 rotates in the groove 460. The wear rings 46 and 47 provide smooth hardened surfaces for guiding the fish line as it passes around the line winding member as will be described presently.

Figure 5:
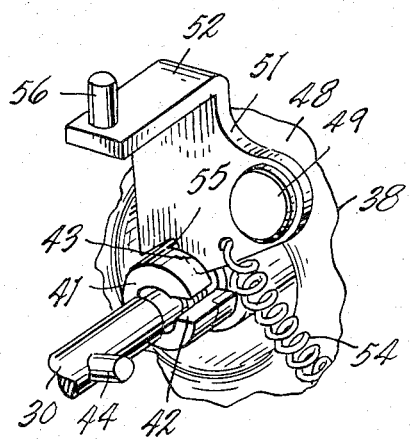
Fig. 5 is an enlarged fragmentary perspective view of the mounting of the line winding finger on the line winding member and the coacting connection between the line winding member and its driving spindle.

The front wall 48 of the line winding member is provided with a rivet-like stud 49 on which the bearing 50 is mounted eccentrically with respect to the spindle 30. A line pick-up finger 51 is pivotally supported on the bearing 50 and provided with an axially turned outer flange 52 adapted to project radially into a slot 53 provided therefor in the cylindrical flange 45 of the line winding member. (See Figs. 1, 2 and 5.) The line pick up finger is connected at its inner end to a coil spring 54 which urges the finger inwardly of the line winding member which urges the inner edge of the finger into the peripheral slot 43 in the bushing 41 where the finger can be cammingly engaged by the previously described pin 44 on the spindle 30. The inner end of the pick up finger 51 is notched to provide an inner stop 55 that engages the outside of the hub supporting the bushing 41 and prevents rotation of the finger past the axial entrance slot 42 for the pin 44 so that the spindle 30 and line winding member 38 will always be engaged in proper relationship for operation of the line pick up finger 51 and by the pin 44. The axially turned flange 52 of the line pick up finger is provided with a radially projecting lug 56 that projects outwardly beyond the periphery of the cylindrical flange 45 and the wear rings 46 and 47 in the extended operating position of the line pick up finger. An outer stop 55–A on the finger engages the inside of the cylindrical flange and limits outward movement of the finger. By providing the hub of the line winding member 38 and the bushing 41 with the registering slots 42 and 43, the bushing and the spindle 30 are invariably assembled in the correct relation to the stud 49 and the line pick up finger 51 on the line winding member.

The line winding member 38 is enclosed by the removable casing 57 having a cylindrical rear end frictionally fitting within the forward end of the previously described drag member 22. The casing 57 has a conical forward end 58 with the annular line guide 59 in the forward end thereof and the casing is provided with an annular inwardly projecting bead 60 positioned around the periphery of the line winding member.

Figure 3:
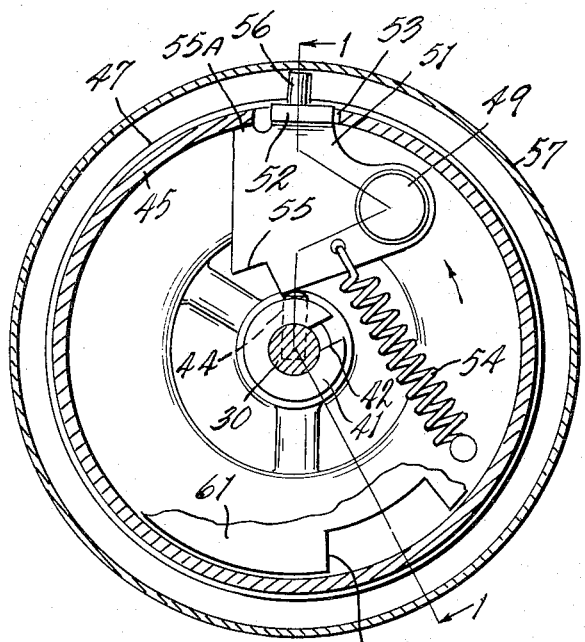
Fig. 3 is a transverse cross-sectional view taken along the plane of the line 3—3 in Fig. 1 and illustrating the line winding and pick up members in line winding position.
Figure 4:
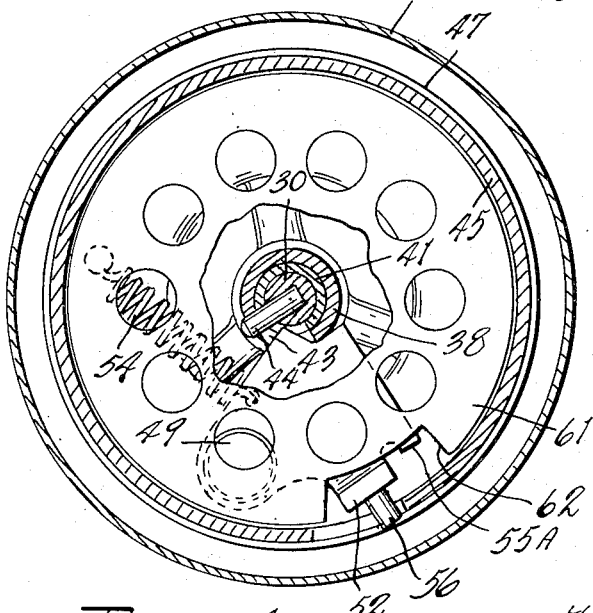
Fig. 4 is a transverse cross-sectional view taken along the plane of the line 4—4 in Fig. 1 but illustrating the line winding and pick up members in retracted inoperative position.

The tubular bushing 14 which supports the spool 12 is provided at its forward end with a non-rotatable axially fixed cam plate 61 which is positioned within the cylindrical flange 45 of the line winding member and in underlying opposed relationship to the axially turned flange 52 of the line pick up finger in all axially adjusted positions of the line winding member 38 and the spindle 30. As is best illustrated in Figs. 3 and 4 this cam plate 61 is provided with a radially recessed notch 62 positioned on the underside of the plate to permit the axially turned flange 52 and the line pick up finger 51 to be rotated on the stud 49 inwardly of the line winding member so as to retract the pin 56 within the line winding member and out of engagement with the line as it passes over the line winding member and the hardened wear rings 46 and 47 from the spool 12 to the guide 59.

Figure 6:
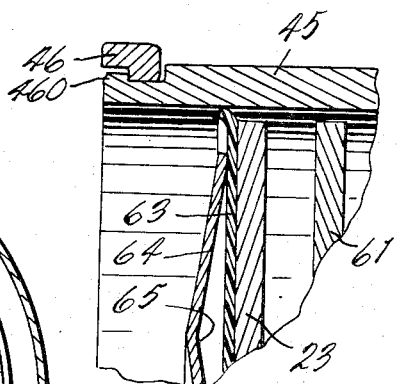
Fig. 6 is a fragmentary enlarged cross-sectional view taken through the rim of the line winding member and the line spool.

In order to prevent loops or coils of the fish line disposed around the spool 12 from moving radially outwardly into entangling engagement between the front flange 23 of the spool and the cylindrical flange 45 of the line winding member the spool is provided with an annular washer 63 of bendable plastic disposed on the inner side of the front flange 23 of the spool and projecting outwardly into engagement with the interior of the annular flange 45 of the line winding member as is best illustrated in Fig. 6. The inner side of the washer 63 is engaged and faced by the annular springable retainer 64 which is desirably made of metal and which is axially bent or dished as at 65 to apply a constant axial pressure on the washer 63 and prevent displacement of the washer as the flange 45 moves axially back and forth over the edge of the washer.

The crank 5 and crank shaft 4 may be provided with a one-way ratchet clutch member 66 which is spring pressed outwardly by the spring 67 (see Fig. 2) toward one-way locking engagement with ratchet teeth 68 carried on the stem of the crank 5. A tubular guard ring and finger piece 69 secured to the ratchet clutch member permits the clutch member to be retracted and lockingly engaged in slots provided therefor in the rim of the bearing 6 as at 70. With the ratchet clutch ring 66 in retracted position the crank 5 and gear 26 can be rotated in either direction but with the clutch member 66 released and spring pressed outwardly the crank can be rotated only in a clockwise direction.

In operation of the reel the cylindrical drag member 22 is adjusted on the threads 9 to provide any desired degree of drag on the friction face 20 of the rear flange of the line spool 12. The fish line is trained over the wear rings 46 and 47 and out through the line guide 59 as at 71. With the crank 5 and spindle 30 stationary and with the flange 52 on the pick up finger registered with the notch 62 in the cam plate 61 the spring 54 holds the line pick up finger 51 inwardly with the stop 55 on the pick up finger engaged with the hub portion of the line winding member 38 to retract the line pick up finger and pin 56 into the position illustrated in Fig. 4. In this position of the reel the line can be drawn off the spool and out through the line guide 59 with the line spinning or rotating around the wear rings 46 and 47 as it uncoils from the spool 12. The spool may also turn in an uncoiling direction depending upon the friction force applied to the spool by the drag member 22.

Figure 2:
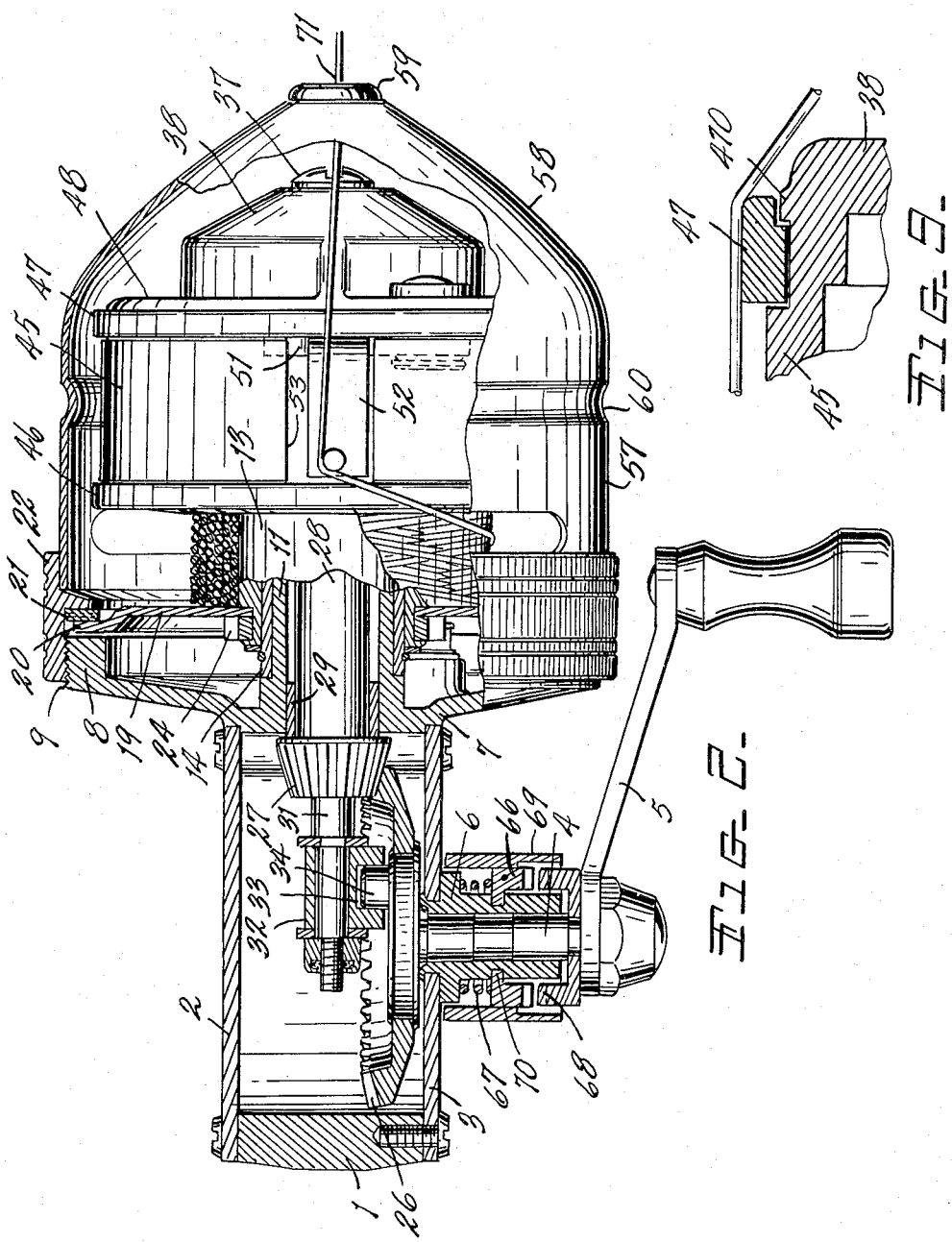
Fig. 2 is a longitudinal horizontal cross-sectional view taken partially along the plane of the line 2—2 in Fig. 1.

If now the crank 5 is rotated forwardly, the pin 44 engages the line pick up finger 51 and moves the pin 56 radially outwardly to intercept the line as illustrated in Fig. 2. Continued rotation of the spindle and pin 44 will rotate the line pick up member and move the flange 52 on the pick up finger angularly out of registry with the notch 62 in the cam plate 61 so that the pick up finger 52 and pin 56 remain in radially projected position and so that continued rotation of the line winding member 38 will cause the pin 56 to rotate around the spool 12 in a motion to lay successive turns of the line around the spool. Simultaneously axial reciprocation of the spindle and the line winding member will result in the pin 56 laying the turns of line along axially spaced portions of the spool in a level winding action. The line winding or recovering action of the pin 56 and line winding member 38 may be partially or entirely overcome depending upon the tension placed on the line and the friction applied to the spool by the drag member 22. If the spool is relatively free to rotate or if the pull on the line as by a fish is relatively strong the spool may rotate and pay out line as fast as the pin 56 tends to replace the line around the spool. When it is desired to again free the line from the pick up finger 51 and pin 56 the crank 5 and spindle 30 need only be rotated rearwardly until the crank is in a position corresponding to the location of the flange 52 over the notch 62 in the cam plate. Reverse rotation of the spindle 30 moves the pin 44 from behind the finger 51 and when the finger snaps into the notch 62 it stops the line winding member 38 with a jerk that is sufficient to rotate the wear rings 46 and 47 slightly. This distributes any wear on the rings. It is pointed out that the annular inwardly projecting bead 60 in the casing 57 prevents the outgoing reach of the line from sticking to the inner surface of the casing where it could not be engaged and picked up by the pin 56. The reel is thus at all times ready to pick up or pay out line at the degree of tension and rate of speed determined by the angler. There is no place in the reel that the line can become jammed or tangled and the elements of the reel are easily dis-assembled for cleaning and oiling.

Having thus described the invention, what is claimed as new and is desired to be secured by Letters Patent is:

1. In a spinning type fishing reel having a spool rotatably mounted on a bearing with a spindle extending rotatably and reciprocally through the bearing, a line winding member axially fixed on the end of said spindle, said spindle having a pin projecting radially therefrom and rotatable relative to said member in a segmental slot in said member, said member having a hub with an axial slot therein permitting entrance of said pin to said segmental slot, a cylindrical flange on said member adapted to embrace said spool upon axial movement of said member, a line pick up finger pivotally supported on said member within said cylindrical flange and eccentrically with respect to said spindle, a spring secured to said member and biasing said finger inwardly toward said spindle, said finger registering with said pin to be cammingly engaged thereby and having a stop portion engageable with said member to limit inward motion of the finger into said segmental slot, a second stop on said finger engageable with said flange to limit outward movement of said finger, a second pin on the outer portion of said finger and swingable therewith through the periphery of said cylindrical flange, hardened and polished annular wear rings having rotatable snap engagement over beads on the ends of the cylindrical flange of said member and on opposite sides of said second pin, an annular plastic washer positioned against the inner side of the outer flange of said spool and having a bendable outer edge engaged with the inside of said flange, an annular axially dished spring clamped at its inner edge to said spool and bearing against said washer to retain the same, and a casing removably surrounding said spool and said member and having an inwardly pressed annular bead surrounding said line winding member.

2. In a spinning type fishing reel having a spool rotatably mounted on a bearing with a spindle extending rotatably and reciprocally through the bearing, a line winding member axially fixed on the end of said spindle, said spindle having a pin projecting radially therefrom and rotatable relative to said member in a segmental slot in said member, said member having a hub with an axial slot therein permitting entrance of said pin to said segmental slot, a cylindrical flange on said member adapted to embrace said spool upon axial movement of said member, a line pick up finger pivotally supported on said member within said cylindrical flange and eccentrically with respect to said spindle, a spring secured to said member and biasing said finger inwardly toward said spindle, said finger registering with said pin to be cammingly engaged thereby and having a stop portion engageable with said member to limit inward motion of the finger into said segmental slot, a second pin on the outer portion of said finger and swingable therewith through the periphery of said cylindrical flange, hardened and polished annular wear rings having rotatable snap engagement over the beads on the ends of the cylindrical flange of said member and on opposite sides of said second pin, an annular plastic washer positioned against the inner side of the outer flange of said spool and having a bendable outer edge engaged with the inside of said flange, an annular axially dished spring clamped at its inner edge to said spool and bearing against said washer to retain the same, and a casing removably surrounding said spool and said member.

3. In a spinning type fishing reel having a spool rotatably mounted on a bearing with a spindle extending rotatably and reciprocally through the bearing, a line winding member axially fixed on the end of said spindle, said spindle having a pin projecting radially therefrom and rotatable relative to said member in a segmental slot in said member, said member having an axial slot formed therein permitting entry of said pin to said segmental slot, a cylindrical flange on said member adapted to embrace said spool upon axial movement of said member, a line pick up finger pivotally supported on said member within said cylindrical flange and eccentrically with respect to said spindle, a spring secured to said member and biasing said finger inwardly toward said spindle, said finger registering with said pin to be cammingly engaged thereby and having a portion engageable with said member to limit inward motion of the finger into said segmental slot, a second pin on the outer portion of said finger and swingable therewith through the periphery of said cylindrical flange, hardened and polished annular wear rings having rotatable snap engagement over beads on the ends of the cylindrical flange of said member and on opposite sides of said second pin, and a casing removably surrounding said spool and said member and having an inwardly pressed annular bead surrounding said line winding member.

4. In a spinning type fishing reel having a spool rotatably mounted on a bearing with a spindle extending rotatably and reciprocally through the bearing, a line winding member axially fixed on the end of said spindle, said spindle having a pin projecting radially therefrom and rotatable relative to said member in a segmental slot in said member, said member having an axial slot formed therein permitting entry of said pin to said segmental slot, a cylindrical flange on said member adapted to embrace said spool upon axial movement of said member, a line pick up finger pivotally supported on said member within said cylindrical flange and eccentrically with respect to said spindle, a spring secured to said member and biasing said finger inwardly toward said spindle, said finger registering with said pin to be cammingly engaged thereby and having a portion engageable with said member to limit inward motion of the finger into said segmental slot, a second pin on the outer portion of said finger and swingable therewith through the periphery of said cylindrical flange, hardened and polished annular wear rings having rotatable snap engagement over beads on the ends of the cylindrical flange of said member and on opposite sides of said second pin, and a casing removably surrounding said spool and said member.

5. In a spinning type fishing reel having a spool rotatably mounted on a bearing with a spindle extending rotatably and reciprocally through the bearing, a line winding member having a hub relatively rotatably mounted and axially fixed on the end of said spindle, said hub defining an axially extending slot opening to the end of the hub toward the end of said bearing and an arcuate segmental slot opening at one end to the other end of said axially extending slot, said spindle having a pin projecting radially therefrom and rotatable relative to said member in said segmental slot in said member, a cylindrical flange on said member adapted to embrace said spool upon axial movement of said member, a line pick up finger pivotally supported on said member within said cylindrical flange and eccentrically with respect to said spindle, a spring secured to said member and biasing said finger inwardly toward said spindle, said finger registering with said pin to be cammingly engaged thereby and having a portion engageable with said member to limit inward motion of the finger into said slot short of said axially extending slot, a second pin on the outer portion of said finger and swingable therewith through the periphery of said cylindrical flange, and a casing removably surrounding said spool and said member and having an inwardly pressed annular bead surrounding said line winding member.

6. In a spinning type fishing reel having a spool rotatably mounted on a bearing with a spindle extending rotatably and reciprocally through the bearing, a line winding member axially fixed on the end of said spindle, said spindle having a pin projecting radially therefrom and rotatable relative to said member in a segmental slot in said member, a cylindrical flange on said member adapted to embrace said spool upon axial movement of said member, a line pick up finger pivotally supported on said member within said cylindrical flange and eccentrically with respect to said spindle, a spring secured to said member and biasing said finger inwardly toward said spindle, said finger registering with said pin to be cammingly engaged thereby, a second pin on the outer portion of said finger and swingable therewith through the periphery of said cylindrical flange, and hardened and polished annular wear rings rotatably mounted on the ends of the cylindrical flange of said member and on opposite sides of said pin.

7. In a spinning type fishing reel having a spool rotatably mounted on a bearing with a spindle extending rotatably and reciprocally through the bearing, a line winding member axially fixed on the end of said spindle, said spindle having a pin projecting radially therefrom and rotatable relative to said member in a segmental slot in said member, a cylindrical flange on said member adapted to embrace said spool upon axial movement of said member, a line pick up finger pivotally supported on said member within said cylindrical flange and eccentrically with respect to said spindle, a spring secured to said member and biasing said finger inwardly toward said spindle, said finger registering with said pin to be cammingly engaged thereby, a second pin on the outer portion of said finger and swingable therewith through the periphery of said cylindrical flange, hardened and polished annular wear rings rotatably mounted on the ends of the cylindrical flange of said member and on opposite sides of said second pin, and a casing removably surrounding said spool and said member and having an inwardly pressed annular bead surrounding said line winding member.

8. A spinning type fishing reel comprising, a casing having a tapering forward end with a line guide at the apex thereof and a cylindrical body at its rear end, a line spool within said casing and rotatable about the axis of the casing, a line winding member within said casing between said spool and said line guide, means for rotating said member about the axis of said casing and for reciprocating said member along said axis, said member having a cylindrical flange adapted to embrace the forward end of said spool, a pin projecting radially from said member to engage a line extending from said spool to said guide and wind the same around said spool, and an annular rib pressed from and extending inwardly of the cylindrical body of said casing and around said member intermediate of the ends of the cylindrical flange thereof to hold the reach of line extending from said spool to said guide inwardly of said casing where the line may be engaged by said pin.

9. A spinning type fishing reel comprising, a casing having a tapering forward end with a line guide at the apex thereof and a cylindrical body at its rear end, a line spool within said casing and rotatable about the axis of the casing, a line winding member within said casing between said spool and said line guide, means for rotating said member about the axis of said casing, said member having a cylindrical flange adapted to embrace the forward end of said spool, a pin projecting radially from said member to engage a line extending from said spool to said guide and wind the same around said spool, and an annular rib extending inwardly of the cylindrical body of said casing and around said member intermediate of the ends of the cylindrical flange thereof to hold the reach of line extending from said spool to said guide inwardly of said casing where the line may be engaged by said pin.

10. In a spinning type fishing reel, the combination of a line winding member having a circular end wall, an axially extending hub portion on the inner side of said end wall, said hub portion being axially slotted from its inner end and having an arcuately extending slot formed therein at the outer end of said axial slot, a bushing pressed into said hub portion and being slotted in registering relation with the slots in said hub portion, a spindle received in said bushing and having a radially extending pin positioned in said segmental slot, a nut threaded on the end of said spindle and axially retaining said spindle in said member, an inwardly extending cylindrical flange on the edge of said end wall, annular beads formed around the axially inner and outer ends of said cylindrical flange, hardened wear rings having internal annular grooves snapped over said beads and being rotatable relative to said flange, a pivot secured to said end wall eccentrically with respect to said hub portion, a line pick up finger pivotally supported on said pivot, a spring connected to said end wall and said finger and biasing the inner end of said finger into said segmental slot and against said pin, a first stop on said finger engageable with said hub portion to limit entry of said finger to said segmental slot short of said axial slot, a second stop on said finger engageable with the inside of said cylindrical flange to limit outward motion of said finger, and an axially turned flange on the outer end of said finger having a radially projecting pin extendable through said cylindrical flange in the outwardly extended position of said finger, said cylindrical flange having a hole forming therein to receive and pass said second pin and said axially turned flange on said finger.

11. In a spinning type fishing reel, the combination of a line winding member having a circular end wall, an axially extending hub portion on the inner side of said end wall, said hub portion being axially slotted from its inner end and having an arcuately extending slot formed therein at the outer end of said axial slot, a bushing pressed into said hub portion and being slotted in registering relation with the slots in said hub portion, a spindle received in said bushing and having a radially extending pin positioned in said segmental slot, a nut threaded on the end of said spindle and axially retaining said spindle in said member, an inwardly extending cylindrical flange on the edge of said end wall, annular beads formed around the axially inner and outer ends of said cylindrical flange, hardened wear rings having internal annular grooves snapped over said beads and being rotatable relative to said flange, a pivot secured to said end wall eccentrically with respect to said hub portion, a line pick up finger pivotally supported on said pivot, a spring connected to said end wall and said finger and biasing the inner end of said finger into said segmental slot and against said pin, a stop on said finger engageable with said hub portion to limit entry of said finger to said segmental slot short of said axial slot, and an axially turned flange on the outer end of said finger having a radially projecting pin extendable through said cylindrical flange in the outwardly extended position of said finger, said cylindrical flange having a hole formed therein to receive and pass said second pin.

12. In a spinning type finishing reel, the combination of a line winding member having a circular end wall, an axially extending hub portion on said end wall, said hub portion being axially slotted from its inner end and having an arcuately extending slot formed therein at the outer end of said axial slot, a bushing pressed into said hub portion and being slotted in registering relation with the slots in said hub portion, a spindle received in said bushing and having a radially extending pin positioned in said segmental slot, means axially retaining said spindle in said member, an inwardly extending cylindrical flange on the edge of said end wall, annular beads formed around the axially inner and outer ends of said cylindrical flange, hardened wear rings having internal annular grooves snapped over said beads and being rotatable relative to said flange, a pivot secured to said end wall eccentrically with respect to said hub portion, a line pick up finger pivotally supported on said pivot, a spring connected to said end wall and said finger and biasing the inner end of said finger into said segmental slot and against said pin, a stop on said finger engageable with said hub portion to limit entry of said finger to said segmental slot short of said axial slot, and a radially projecting pin on the outer end of said finger extendable through said cylindrical flange in the outwardly extending position of said finger, said cylindrical flange having a hole formed therein to receive and pass said second pin.

13. In a spinning type fishing reel, the combination of a line winding member having a circular end wall, an axially extending hub portion on said end wall, said hub portion being axially slotted from its inner end and having an arcuately extending slot formed therein at the outer end of said axial slot, a bushing pressed into said hub portion and being slotted in registering relation with the slots in said hub portion, a spindle received in said bushing and having a radially extending pin positioned in said segmental slot, means axially retaining said spindle in said member, an inwardly extending cylindrical flange on the edge of said end wall, hardened wear rings on the ends of said flange and being rotatable relative to said flange, a pivot secured to said end wall eccentrically with respect to said hub portion, a line pick up finger pivotally supported on said pivot, a spring connection to said end wall and said finger and biasing the inner end of said finger into said segmental slot and against said pin, a stop on said finger engageable with said hub portion to limit entry of said finger to said segmental slot short of said axial slot, and a radially projecting pin on the outer end of said finger extendable through said cylindrical flange in the outwardly extended position of said finger, said cylindrical flange having a hole formed therein to receive and pass said second pin.

14. In a spinning type fishing reel, the combination of a line winding member having a circular end wall, a spindle received in said end wall, means axially retaining said spindle in said member, an inwardly extending cylindrical flange on the edge of said end wall, annular beads formed around the axially inner and outer ends of said cylindrical flange, and hardened wear rings having internal annular grooves snapped over said beads and being rotatable relative to said flange.

15. In a spinning type fishing reel, the combination of a line winding member having a circular end wall, a spindle received in said end wall, means retaining said spindle in said member, an inwardly extending cylindrical flange on the edge of said end wall, and hardened wear rings on the ends of said flange and being rotatable relative to said flange.

16. In a spinning type fishing reel, a line supporting spool comprising a hub portion having inner and outer circular end flanges, said outer end flange being of shorter diameter than said inner flange, a guard plate of thin flexible plastic secured to the inner side of said outer end flange and projecting slightly therebeyond, and a guard plate retaining spring of annular inwardly axially dished shape lapped against the inner side of said guard plate, the radially inner edges of said outer end flange, guard plate and spring being clampingly retained against a shoulder on said hub portion by an outwardly folded bead on the end of the hub portion.

17. In a spinning type fishing reel, a line supporting spool comprising a hub portion having inner and outer circular end flanges, said outer end flange being of shorter diameter than said inner flange, a guard plate of thin flexible material secured to the inner side of said outer end flange and projecting slightly therebeyond, and a guard plate retaining spring of annular inwardly axially dished shape lapped against the inner side of said guard plate, the radially inner edges of said outer end flange, a guard plate and spring being clampingly retained on said hub portion.

18. In a spinning type fishing reel, a line supporting spool comprising a hub portion having inner and outer circular end flanges, a guard plate of thin flexible material secured to the inner side of said outer end flange and projecting slightly therebeyond, and a guard plate retaining spring lapped against the inner side of said guard plate, said spring having its radially inner edge clampingly retained between said hub portion and said guard plate and having an axially bowed radially outer portion yieldably bearing at its outer edge against said plate.

19. In a spinning type fishing reel, the combination of a line winding member having a circular end wall, an axially extending hub portion on said end wall, said hub portion being axially slotted from its inner end and having an arcuately extending slot formed therein at the outer end of said axial slot, a bushing pressed into said hub portion and being slotted in registering relation with the slots in said hub portion, a spindle received in said bushing and having a radially extending pin positioned in said segmental slot, means axially retaining said spindle in said member, an inwardly extending cylindrical flange on the edge of said end wall, a pivot secured to said end wall eccentrically with respect to said hub portion, a line pick up finger pivotally supported on said pivot, a spring connected to said end wall and head finger and biasing the inner end of said finger into said segmental slot and against said pin, a stop on said finger engageable with said hub portion to limit entry of said finger to said segmental slot short of said axial slot, a radially projecting pin on the outer end of said finger extendable through said cylindrical flange in the outwardly extended position of said finger, said cylindrical flange having a hole formed therein to receive and pass said second pin.

References Cited in the file of this patent
UNITED STATES PATENTS

| | | |
|---|---|---|
| 2,630,979 | Uerling et al. | Mar. 10, 1953 |
| 2,644,647 | Denison et al. | July 7, 1953 |
| 2,649,258 | Shelburne | Aug. 18, 1953 |
| 2,724,563 | Shakespeare et al. | Nov. 22, 1955 |